United States Patent
Botura et al.

(10) Patent No.: US 7,441,725 B2
(45) Date of Patent: Oct. 28, 2008

(54) AIRCRAFT WET WING

(75) Inventors: Galdemir C. Botura, North Canton, OH (US); Daniel Paul Christy, Akron, OH (US); David C. Flosdorf, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 587 days.

(21) Appl. No.: 11/112,237

(22) Filed: Apr. 22, 2005

(65) Prior Publication Data

US 2006/0237589 A1 Oct. 26, 2006

(51) Int. Cl.
*B64C 1/00* (2006.01)
(52) U.S. Cl. ............... 244/121; 244/1 R; 244/134 D
(58) Field of Classification Search ........... 244/1 R, 244/121, 123.1, 134 D
See application file for complete search history.

(56) References Cited

U.S. PATENT DOCUMENTS

| | | | |
|---|---|---|---|
| 4,581,504 A | 4/1986 | Hamel, Sr. ........ | 200/61.08 |
| 4,814,931 A | 3/1989 | Kugelman et al. ........ | 361/56 |
| 5,089,926 A | 2/1992 | Kugelman ........ | 361/87 |
| 5,481,139 A | 1/1996 | Lucas ........ | 307/9.1 |
| 2004/0212940 A1 | 10/2004 | Kugelman et al. ........ | 361/85 |
| 2004/0222701 A1 | 11/2004 | Kugelman ........ | 307/131 |

FOREIGN PATENT DOCUMENTS

| | | |
|---|---|---|
| GB | 497163 | 12/1938 |
| JP | 2001314026 | 11/2001 |

OTHER PUBLICATIONS

GB0607497.5; Great Britain Search Report dated Jul. 26, 2006.

*Primary Examiner*—Timothy D Collins
(74) *Attorney, Agent, or Firm*—Renner, Otto, Boisselle & Sklar

(57) ABSTRACT

An aircraft wing (12) comprising a structural casing (14) defining a leading edge, a fuel cell (16) within the structural casing (14), a deicer (18) having electrical lines which receive a supply of electrical power from an onboard power source, and a trip line (20). The trip line (20) is positioned to receive early contact upon impact of the wing by a bird or other foreign object and disruption of the trip line triggers termination of the supply of electrical power to the deicer (18).

23 Claims, 2 Drawing Sheets

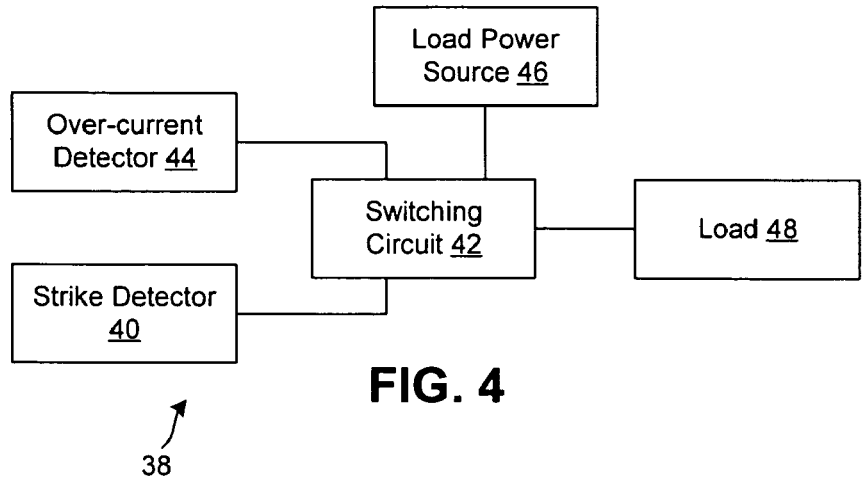
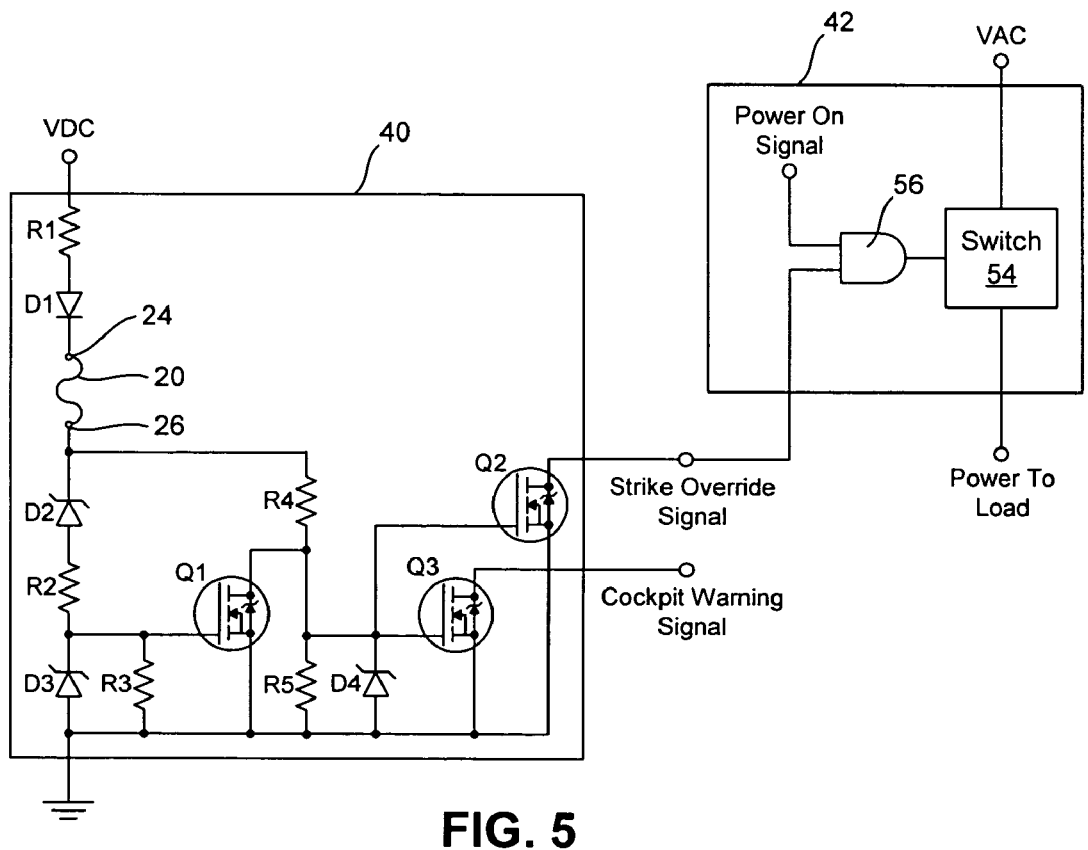

AIRCRAFT WET WING

FIELD OF THE INVENTION

This application relates generally, as indicated, to an aircraft wet wing, and, more particularly, to an aircraft wet wing having a deicer installed on its leading edge.

BACKGROUND OF THE INVENTION

An aircraft wing can be designed to carry fuel for the aircraft and, to this end, the wing can comprise a fuel cell within its structural casing. Such an aircraft wing (often called a "wet wing") can also include a deicer installed on its leading edge to remove ice that forms thereon during flight. A deicer will commonly be electrically heated and/or electrically controlled whereby electric lines will be present on the wing, sometimes in the vicinity of the fuel cell.

SUMMARY OF THE INVENTION

The present invention provides an electrical trip line for an aircraft wet wing. The trip line can be used in conjunction with a deicer having electric lines at risk of being severed, damaged or exposed during flight by, for example, impact with a bird or other foreign object. With such a deicer, if power is continued to be supplied after impact to the electrical lines, a voltage potential could be present near the fuel cell. The trip line of the present invention senses an impact so that, upon impact, electric power supply to the deicer may be immediately discontinued and thereby prevent a voltage potential near the fuel cell.

More particularly, the present invention provides an aircraft wing comprising a structural casing defining a leading edge, a fuel cell within the structural casing, a deicer having electrical lines which receive a supply of electrical power from an onboard power source, and a trip line. Upon impact of the wing by a bird or other foreign object, the trip line will receive early contact (e.g., before, at the same time, or slightly after the electrical lines are impacted) and be disrupted. Disruption of the trip line triggers termination of the supply of electrical power to the deicer.

The present invention may be employed on a wet wing, or any impact-susceptible part of an aircraft wherein electrical lines are located near a fuel container. The invention may also be useful in situations where fuel is not an issue, to prevent, for example, an electrical short to the frame of the aircraft. These and other features of the invention are fully described and particularly pointed out in the claims. The following description and annexed drawings set forth in detail a certain illustrative embodiment of the invention, this embodiment being indicative of but one of the various ways in which the principles of the invention may be employed.

DRAWINGS

FIG. 4 is a block diagram of an object-strike protection circuit assembly according to the present invention.

FIG. 5 is a schematic diagram of a strike detector component and partial switching circuit component of the object-strike protection circuit assembly.

DETAILED DESCRIPTION

Figure 1:
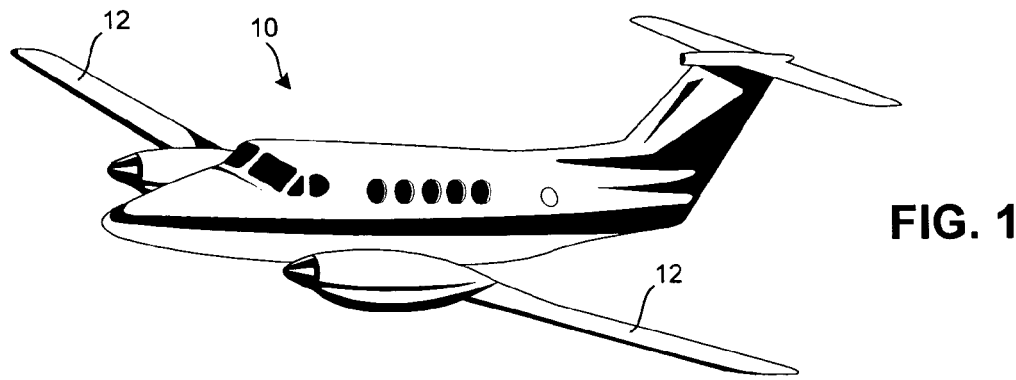
FIG. 1 is a schematic view of an aircraft having a pair of wet wings according to the present invention.
Figure 2:
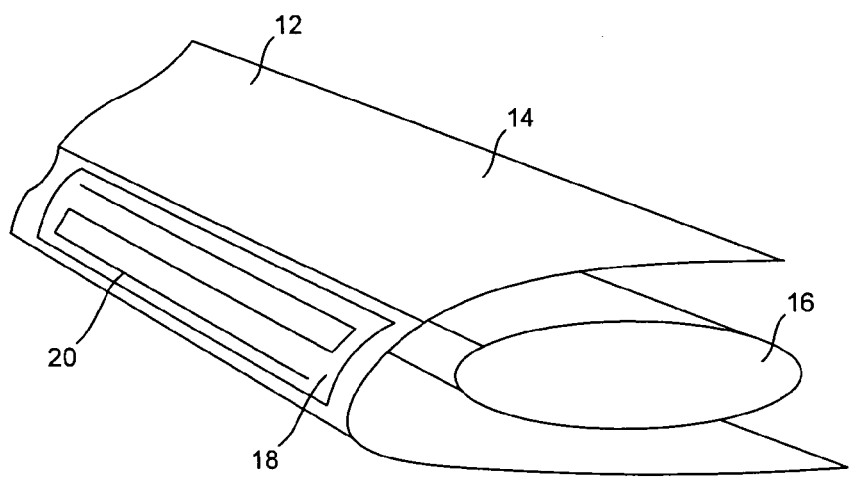
FIG. 2 is a close-up schematic view of a portion of one wet wing shown partially broken away, the wing including a structural casing, a fuel cell, an electrically powered and/or controlled deicer, and a trip line according to the present invention.

Referring now to the drawings in detail, and initially to FIG. 1, an aircraft 10 having a pair of wet wings 12 according to the present invention is shown. As is shown in more detail in FIG. 2, the wet wing 12 includes a structural casing 14 defining a leading edge, a fuel cell 16 within the structural casing 14, an electrically controlled and/or powered deicer 18, and a trip line 20. Although not specifically shown in the drawings, the wing 12 can additionally include honeycomb or another light-weight material filling the space between the structural casing 14 and the fuel cell 16.

The deicer 18 can be, for example, an electromechanical deicing device, an electro-thermal ice-protection device, or any other device that receives electrical power from an onboard power source (e.g., power source 46 introduced below). In the context of the present invention, "deicer" is intended to cover both devices which remove ice after it has formed on the relevant surface and devices which prevent formation of ice on the relevant surface. The latter devices are sometimes referred to as anti-icers or anti-icing devices.

The deicer 18 includes electrical lines or conductors (not specifically shown) that are positioned with respect to the casing 14 in the vicinity of the fuel cell 16. If these electric lines are ruptured, severed, exposed, or otherwise damaged during flight, a voltage potential could be present near the fuel cell 16. The trip line 20 is used to sense impact of a bird or other foreign object with the wing 12 and invoke shut-off of electric power to the deicer 18 if the wing 12 is impacted by a bird or other foreign object during flight.

Figure 3:
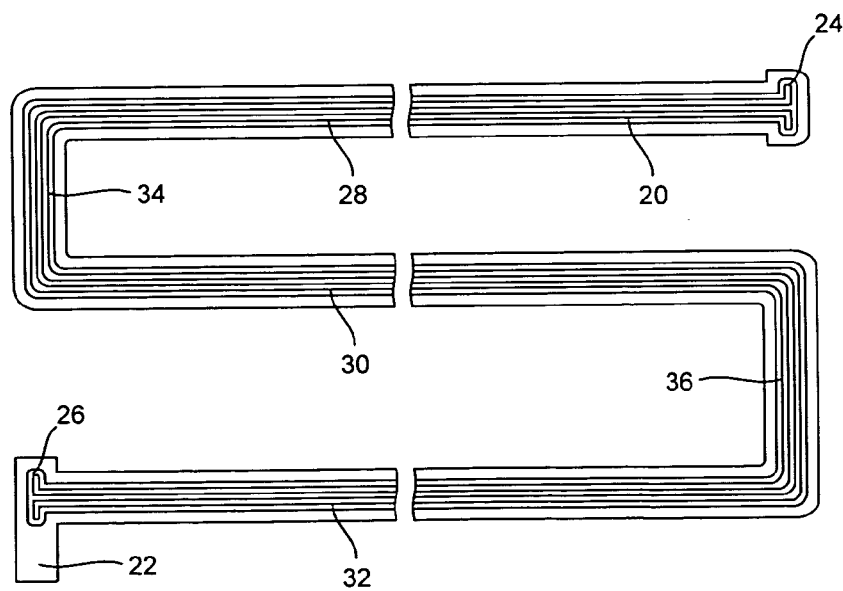
FIG. 3 is a plan view of the trip line and its carrier substrate prior to installation on the structural casing.

Referring now additionally to FIG. 3, the trip line 20 can be printed on or otherwise carried by a substrate 22. The substrate 22 can comprise any suitable substrate, such as a dielectric substrate, which adequately carries the trip line 20 and which can be appropriately installed on the desired portion of the aircraft. For example, in the illustrated embodiment, the substrate 22 is positioned around the leading edge of the wing 12 whereby it should be capable of accommodating this curved contour. Also in the illustrated embodiment, the substrate 22 outlines the shape of the trip line 20 although other arrangements are certainly possible. Although not specifically shown in the drawing, an electric shield can be provided around the trip line 20 to provide shielding from radiated electrical interference to minimize the risk of false triggering.

The trip line 20 comprises a first end 24, a second end 26, and when the trip line 20 is intact, a conductive path therebetween. The conductive path can be established by a single conductor, wire or trace, or, as shown, plural parallel conductors, wires or traces. The trip line 20, is shaped, arranged, and/or positioned to receive early contact upon the wing 12 being impacted by a bird or other foreign object. "Early contact" in the context of the present invention refers to the trip line 20 being contacted before, at the same time as, or slightly after (i.e., less than 1 millisecond after) the relevant electrical lines. In any event, the trip line 20 is positioned to receive impact contact prior to the fuel cell 16 and, as explained in more detail below, to allow power cut off prior to the impact reaching the fuel cell 16.

In the illustrated embodiment, the trip line 20 has a flattened "S" shape with relatively long span sections 28, 30 and 32, and connecting sections 34 and 36 therebetween. The first span section 28 can be positioned along an upper wing side, the second span section 30 can be positioned along the leading edge, and the third span section 32 can be positioned along the lower wing side. However, other shapes, sizes or arrangements that place the trip line 20 in a position for contact before, at the same time, or slightly after the relevant electrical lines, are certainly possible with, and contemplated by the present invention.

Referring additionally to FIG. 4, a block diagram of an object-strike protection circuit 38 is provided. Upon detection of a bird or foreign object strike (i.e., upon disruption of the trip line 20), the circuit 38 shuts off electrical power to the deicer 18. The electrical power is shut off in a very rapid manner, specifically within a window of time between when the disruption of the conductivity of the trip line 20 and the predicted potential impact of the object with the fuel cell 16. Thus, shut-off time is a function of the airspeed of the aircraft 10, airspeed of the impacting object and the position of the fuel cell 16 relative to the leading edge. For example, with an expected airspeed of a bird relative to an aircraft is 270 knots (i.e., about 5470 inches per second) and the fuel cell 16 positioned six inches aft of the leading edge, the electrical power to the deicer 18 should be shut off within 1.097 milliseconds. In any event, the window of time between the conductive path of the trip line 20 being disrupted and the shut-off of electrical power is preferably less than 5 milliseconds, less than 4 milliseconds, less than 3 milliseconds, less than 2 milliseconds and/or less than 1 millisecond.

The object-strike protection circuit 38 includes a strike detector 40 (which includes the trip line 20) and a switching circuit 42. The circuit 38 may further include additional sensors or detectors, such as the illustrated over-current detector 44. The circuit 38 may be coupled to a power source 46, such as a single phase or multi-phase alternating current source, and a load 48 that is electrically driven by the power source 46 by way of the switching circuit 42. In the embodiment, the load 48 would be the electrical heaters and/or electrical controllers of the deicer 18. The strike detector 40 supplies a control signal to the switching circuit 42 to force the switching circuit 42 to discontinue the supply of electrical power to the load 48 upon the occurrence of certain events. The switching circuit 42 can include a clamping operation to shut off power from the power source 46 to the load 48.

Referring now to FIG. 5, the strike detector 40 and a portion of the switching circuit 42 is schematically shown. As will be appreciated, the strike detector 40 is configured to generate an output to invoke termination of the supply of electrical power to a load upon the occurrence of certain events. These events include a loss of electrical continuity from one end of the trip line 20 to another end of the trip line 20, contact or electrical bridging of the trip line 20 with a high voltage line or potential (e.g., a 115 volt electrical conductor of a deicer), or contact or electrical bridging of the trip line 20 to electrical ground (e.g., the aircraft structure). Therefore, as used herein, "disruption" (and other forms of the root word "disrupt") of the trip line 20 or of the conductive path of the trip line 20 is meant to include any of the foregoing scenarios. However, for simplicity of the description herein, the strike detector will be described in the example context of when an impact results in loss of continuity from the first end 24 to the second end 26.

A sensing voltage, such as a DC voltage (VDC), is applied across the trip line 20. For example, the sensing voltage can be coupled to a first end 24 of the trip line 20 through a series resistor R1 and series diode D1 and a second 26 end of the trip line 20 can be coupled to ground through the series combination of Zener diode D2, series resistor R2, and Zener diode D3/resister R3, which are connected in parallel. The gate of a power MOSFET Q1 (e.g., model IRF7490 available from International Rectifier) can be connected to a node between resistors R2 and R3. The drain of MOSFET Q1 can be connected between resistors R4 and R5, which form a voltage divider between the second end 26 and ground. The source of the MOSFET Q1 can be connected to ground. In parallel with resistor R5 can be Zener diode D4.

The gate of a power MOSFET Q2 (e.g., model IRF7490) can be connected to the node between resistors R4 and R5. The source of the MOSFET Q2 can be grounded. The drain of MOSFET Q2 provides an output signal from the strike detector 40, which can be considered a strike override signal. If the trip line 20 is not disrupted (e.g., the trip line 20 is intact and has electrical continuity from the first end 24 to the second end 26), the strike override signal will indicate that no impact related damage to at least the trip line 20 is present. In one embodiment, the strike override signal can be logical high when the trip line 20 is not disrupted. If the trip line 20 is disrupted (e.g., the trip line 20 is not intact and is without electrical continuity from the first end 24 to the second end 26 as caused by an event such as a strike by a bird or other foreign object), the strike override signal will indicate that impact related damage to at least the trip line 20 is present. In one embodiment, the strike override signal can be logical low when the trip line 20 is disrupted.

The strike override signal can be input to the switching circuit 42 that includes a switch 54 for controlling the application of electrical power from the load power source 46 to the load 48. The switch 54 can be, for example, a solid state relay assembly for switching AC power to the load. Suitable switches implemented as a switching assemblies are disclosed in U.S. Patent Application Publication Nos. 2004/0212940 and 2004/0222701, the entire disclosures of which are herein incorporated by reference in their entireties. In those switching assemblies, application of power is supplied to the load (e.g., the load 48) using series switches implemented with power FET type devices. The power FETs are gated with latches (e.g., flip-flops) that are controlled, in part, by an optically isolated power-on signal. For example, when it is desired that power should be applied to the load, the power-on signal can be logical high and when it is desired that power should not be applied to the load, the power-on signal can be logical low. The power-on signal can be regulated by any number and/or combination of manners, including, for example, a cockpit switch, the over-current detector 44, a temperature controller switch (e.g., thermostat), a deicer controller forming part of the deicer 18 and so forth.

To effectuate additional control of the switching circuit 42 with the strike override signal, a logical AND operation can be carried out to combine the power-on signal with the strike override signal using an AND gate 56 to generate a switch control signal. If appropriate, the power-on signal, the strike override signal and/or the switch control signal can be inverted to attained a desired logical state of the signals. Of course, it will be recognized that the power-on signal, the strike override signal and/or the switch control signal need not be implemented as digital logic values and combining the power-on signal and the strike override signal can be carried out in any suitable manner or not combined, if appropriate (e.g., the signals can be used to gate separate FETs where the source of one is connected to the drain of another).

The switch control signal from the AND gate 56 can be used as a control signal for the switch 54 to selectively control the application of electrical power from the load power source 46 to the load 48. For example, the switch control signal can be used to control an optically isolated FET that controls the latches in the solid state relay assembly of the above-mentioned U.S. Patent Application Publication Nos. 2004/0212940 and 2004/0222701. As will be appreciated, if the strike override signal indicates that the trip line 20 is not disrupted, the switch 54 will operate in a normal manner based on the state of the power-on signal. But if the strike override signal indicates that the trip line 20 is disrupted, the switch 54 will turn off power to the load 48 if in a presently applied state and not turn on power to the load 48 if called for by the power-on signal at some point in the future. Tests have shown that when the strike override signal is generated using the strike detector 40 illustrated in FIG. 4 and the switch 54 is implemented with the solid state relay assembly of the above-mentioned U.S. patent application publications, a desired speed of discontinuing the application of single phase or multi-phase power to the load 48 can be achieved.

In another embodiment, the voltage at the first end 24 can be used as the basis for the strike override signal. For instance, the strike detector 40 can include the application of a DC voltage to first end 24 of the trip line 20 via a resistor (e.g., R1) and the second end 26 can be coupled to ground. When the trip line 20 is not disrupted, the voltage at the first end will be the ground potential (e.g., zero volts) or close to the ground potential depending on the resistance of the trip line 20, connectors, lead wires, etc. When the trip line 20 is disrupted, the voltage at the first end 24 will rise. In one arrangement, a logic inverter can be connected to generate an output based on the voltage at the first end 24 to generate the strike override signal at the output of the inverter. This signal can be combined with the power-on signal in, for example, the manner described above.

Similar to how the strike override signal is generated, the switch 54 can be implemented in any suitable manner. For example, the switch 54 can be or include a solid state relay assembly as described above, one or more FETs gated in accordance with the strike override signal (sometimes referred to as a crowbar), a microprocessor controller, or any other discrete or programmable component or combination of components.

In addition to generating a strike override signal used to invoke the disconnection of the electrical power to a particular system or otherwise shut off an electrical, hydraulic or mechanical system, a strike warning signal can be generated. The strike warning signal can be made available to cockpit instrumentation to alert the pilot, can be input to a flight controller and/or used in any appropriate manner to regular events occurring with respect to the aircraft. In the illustrated embodiment, the strike warning signal can be generated by connecting the gate of a power MOSFET Q3 (e.g., model IRF7490) to the node between resistors R4 and R5. The source of the MOSFET Q3 can be grounded and the drain of MOSFET Q3 provides the warning signal in similar manner to the way MOSFET Q2 generates the strike override signal.

The present invention is described in the example context of shutting off electrical power to a deicer 18 on a wet wing 12 in the event that the wing is struck by a bird or other object. However, the present invention is not limited to a deicer and/or a wing, and can be used on any impact-susceptible part of an aircraft. For example, the trip line 20 and/or object-strike protection circuit 38 can be used in an engine rotor explosion impact area to shut down a system near a fuel container (e.g., a fuel tank, a fuel cell, a fuel conduit, etc.). Moreover, the trip line 20 and/or object-strike protection circuit 38 can be used even if interaction with fuel is not an issue, such as, for example, to prevent impact-affected electrical lines from being shorted to the frame of the aircraft.

One may now appreciate that the present invention provides an electrical trip line for an impact-susceptible part of an aircraft that allows quick discontinuation of electric power supply to avoid an undesired voltage potential. Although the invention has been shown and described with respect to certain embodiments, it is evident that equivalent alterations and modifications will occur to others skilled in the art upon the reading and understanding of this specification. The present invention includes all such alterations and modifications and is limited only by the scope of the following claims.

The invention claimed is:

1. An aircraft wing comprising:
   a structural casing defining a leading edge,
   a fuel cell within the structural casing,
   a deicer having electrical lines which receive a supply of electrical power from an onboard power source, and
   a trip line positioned to receive contact before, during, or slightly after the electrical lines, and before the fuel cell, upon impact of the wing by a bird or other foreign object.

2. An aircraft comprising a fuselage and two of the aircraft wings set forth in claim 1.

3. An aircraft wing as set forth in claim 1, wherein the trip line has a first end, a second end, and a conductive path therebetween, and wherein the impact will disrupt the conductive path of the trip line.

4. An aircraft wing as set forth in claim 3, further comprising object-strike protection circuit that terminates the supply of electrical power to the deicer upon the conductive path of the trip line being disrupted.

5. An aircraft wing as set forth in claim 4, wherein the strike protection circuit terminates the supply of electrical power within a window of time less than the expected time between the conductive path of the trip line being disrupted and a predicted potential impact with the fuel cell.

6. An aircraft wing as set forth in claim 5, wherein the window of time is less than 5 milliseconds.

7. An aircraft wing as set forth in claim 6, wherein the window of time is less than 2 milliseconds.

8. An aircraft wing as set forth in claim 4, wherein the object-strike protection circuit comprises:
   a strike detector that includes the trip line and that outputs a strike override signal indicative of disruption of the conductive path of the trip line; and
   a switching circuit that terminates the supply of electrical power to the deicer if the strike override signal indicates that the conductive path of the trip line has been disrupted.

9. An aircraft wing as set forth in claim 8, wherein the switching circuit includes a solid state relay assembly controlled by the combination of a power-on signal indicating a desired power state for the deicer and the strike override signal.

10. An aircraft wing as set forth in claim 3, wherein the conductive path of the trip line includes a span section positioned along the leading edge.

11. An aircraft wing as set forth in claim 10, wherein the conductive path further comprises at least one of a span section positioned above the leading edge and a span section positioned below the leading edge.

12. An impact-susceptible portion of an aircraft, comprising:
   electrical lines which receive a supply of electrical power from an onboard power source;
   a trip line which is positioned to receive impact; and
   an object-strike protection circuit that terminates the supply of electrical power to the electrical lines upon the trip line being impacted;
   wherein the electrical lines are situated in the vicinity of a fuel container and the trip line is positioned to receive impact before the fuel container.

13. An impact-susceptible portion of an aircraft as set forth in claim 12, wherein the trip line has a first end, a second end, and a conductive path therebetween, wherein the impact will disrupt the conductive path, and wherein the object-strike protection circuit terminates the supply of electrical power upon the conductive path of the trip line being disrupted.

14. An impact-susceptible part of an aircraft as set forth in claim 13, wherein the object-strike protection circuit terminates the supply of electrical power within a window of time less than the expected time between the conductive path of the trip line being disrupted and a predicted potential impact with the fuel container.

15. An impact-susceptible part of an aircraft as set forth in claim 12, wherein the object-strike protection circuit comprises:
    a strike detector that includes the trip line and that outputs a strike override signal indicative of continuity or disruption of the conductive path of the trip line; and
    a switching circuit that terminates the supply of electrical power to the deicer if the strike override signal indicates that the conductive path of the trip line has been disrupted.

16. A method of detecting an impact of a bird or foreign object with an aircraft, comprising:
    generating a strike override signal indicative of impact of the bird or foreign object with a trip line positioned with respect to the aircraft; and
    switching off power to a load in response to the strike override signal within a window of time less than the expected time between the conductive path of the trip line being disrupted and a predicted potential impact with a fuel container.

17. A method as set forth in claim 16, wherein the window of time is less than 5 milliseconds.

18. A method as set forth in claim 17, wherein the window of time is less than 2 milliseconds.

19. An object-strike protection circuit as set forth in claim 17, wherein the window of time is less than 2 milliseconds.

20. An object-strike protection circuit for an aircraft, comprising:
    a strike detector including a trip line positionable with respect to the aircraft for contact upon impact by a bird or foreign object, the strike detector outputting a strike override signal indicative of disruption of the trip line; and
    a switching circuit to terminate the supply of electrical power to a load if the strike override signal indicates that the trip line has been disrupted;
    wherein the switching circuit includes a solid state relay assembly controlled by the combination of a power-on signal indicating a desired power state for a load and the strike override signal.

21. A deicing assembly for an aircraft, comprising:
    the object-strike protection circuit of claim 20; and
    a deicer arranged with the object-strike protection circuit as the load.

22. An object-strike protection circuit as set forth in claim 20, wherein the strike detector outputs the strike override signal and the switching circuit terminates the supply of electrical power with a window of time less than the expected time between the conductive path of the trip line being disrupted and a predicted potential impact with a fuel container.

23. An object-strike protection circuit as set forth in claim 22, wherein the window of time is less than 5 milliseconds.

* * * * *